United States Patent [19]
Corniani et al.

[11] Patent Number: 5,927,468
[45] Date of Patent: Jul. 27, 1999

[54] METHOD AND UNIT FOR ORIENTING PUMP-OPERATED CAPS

[75] Inventors: Carlo Corniani; Ivo Bianchini, both of Marmirolo, Italy

[73] Assignee: Azionaria Costruzioni Macchine Automatiche A.C.M.A. S.p.A., Bologna, Italy

[21] Appl. No.: 08/917,199

[22] Filed: Aug. 25, 1997

[30] Foreign Application Priority Data

Aug. 26, 1996 [IT] Italy ................. B096A 0443

[51] Int. Cl.⁶ ................. B65G 47/244; B65G 29/00
[52] U.S. Cl. ................. 198/394; 198/450; 198/416; 198/400; 198/392
[58] Field of Search ................. 198/394, 400, 198/450, 416

[56] References Cited

U.S. PATENT DOCUMENTS

| | | | |
|---|---|---|---|
| 3,178,006 | 4/1965 | Nigrelli et al. | 198/450 |
| 4,274,533 | 6/1981 | Abe | 198/450 |
| 4,779,714 | 10/1988 | Madden | 198/399 |
| 5,396,979 | 3/1995 | Wysocki | 198/392 |

FOREIGN PATENT DOCUMENTS

| | | |
|---|---|---|
| 0 405 314 A1 | 1/1991 | European Pat. Off. |
| 2 023 082 | 12/1979 | United Kingdom . |

*Primary Examiner*—William E. Terrell
*Assistant Examiner*—Mark Deuble
*Attorney, Agent, or Firm*—Larson & Taylor

[57] ABSTRACT

A method and unit for orienting pump-operated caps, whereby a disorderly succession of caps, each having an elongated head and a draw tube extending from the head, is fed on a conveying surface to an engaging station. At the engaging station the draw tube of each cap is engaged by an orienting seat and an elastic cord. The seat is movable with respect to the elastic cord, and cooperates with the elastic cord to rotate the cap about a respective axis of rotation crosswise to the conveying surface, so as to impart a given orientation to the cap.

10 Claims, 3 Drawing Sheets

METHOD AND UNIT FOR ORIENTING PUMP-OPERATED CAPS

BACKGROUND OF THE INVENTION

The present invention relates to a method of orienting pump-operated caps.

The present invention may be applied to advantage to capping machines in general and to bottle capping machines in particular, to which the following description refers purely by way of example.

Bottle capping machines are supplied with a disorderly succession of randomly-oriented pump-operated caps comprising an elongated head fitted inside with a draw tube; and the caps are oriented the same way to form an orderly succession of equioriented caps. To orient the caps all facing the same way in said orderly succession, known capping machines normally feature an orienting device located at the input and forming an integral part of the machine.

Besides being fairly complex in design and expensive to produce, the orienting devices of known capping machines of the above type seriously complicate the already complex structure and maintenance of the machine.

SUMMARY OF THE INVENTION

It is an object of the present invention to provide a straightforward, low-cost method of orienting pump-operated caps, and which provides for greatly simplifying the structure of the capping machine.

According to the present invention, there is provided a method of orienting pump-operated caps; each cap comprising an elongated head and a cylindrical portion extending crosswise from the head; the method comprising the steps of feeding a disorderly succession of caps along a path extending along a conveying surface and through an engaging station, and orienting the caps the same way by rotating each cap about a respective axis of rotation crosswise to the conveying surface; and the method being characterized in that the caps are rotated by engaging the cylindrical portion of each cap by means of engaging means movable through said engaging station, and by further conveying the caps with the respective cylindrical portions contacting elastic means extending along said path from at least said engaging station.

The present invention also relates to a unit for orienting pump-operated caps.

According to the present invention, there is provided a unit for orienting pump-operated caps; each cap comprising an elongated head and a cylindrical portion extending crosswise from the head; the unit comprising conveying means for feeding a disorderly succession of caps along a path extending along a conveying surface and through an engaging station, and orienting means for orienting the caps the same way by rotating each cap about a respective axis of rotation crosswise to the conveying surface; and the unit being characterized in that said orienting means comprise engaging means movable through said engaging station to engage the cylindrical portion of each cap; and elastic means located along said path from at least said engaging station, and cooperating with said engaging means to rotate each cap about the respective axis of rotation.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
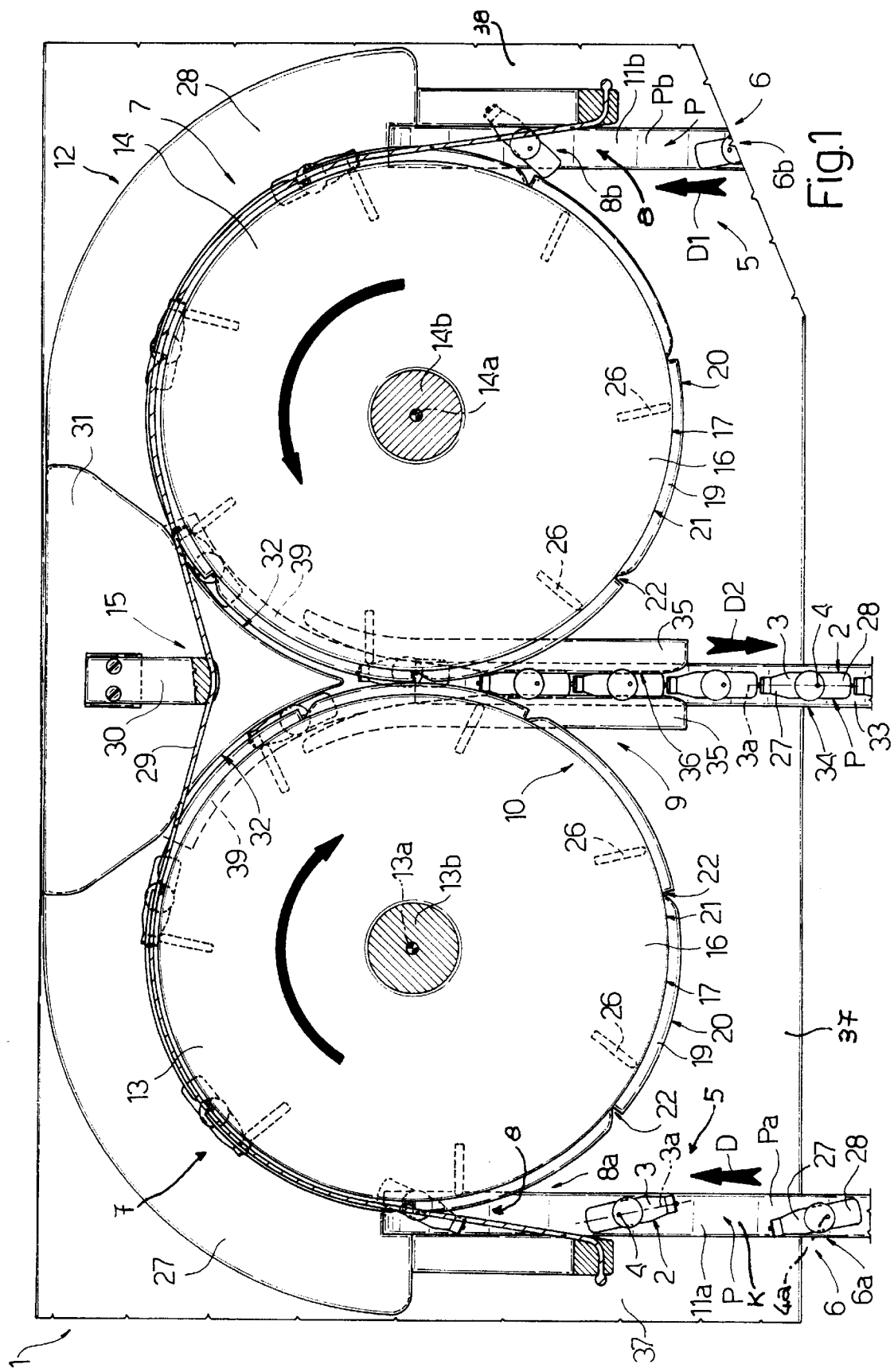
FIG. 1 shows a plan view, with parts in section and parts removed for clarity, of a preferred embodiment of an orienting un it in accordance with the present invention.

Number 1 in FIG. 1 indicates a unit for orienting pump-operated caps 2, each comprising an elongated head 3 with a longitudinal axis 3a, and a cylindrical portion comprising a draw tube 4 fitted inside head 3 and extending from head 3 substantially along a respective longitudinal axis 4a crosswise to axis 3a.

Unit 1 provides for feeding caps 2 to a known capping machine (not shown), and comprises conveying means in turn comprising an input conveying device 5 for feeding a disorderly succession 6 of caps 2 in a direction D and along a path P; orienting means in turn comprising an orienting device 7 located along path P to receive caps 2 from device 5 at an engaging station 8, and to orient caps 2 the same way by rotating each cap 2 about respective axis 4a; and an output conveying device 9 for receiving caps 2 from device 7 at an unloading station 10 downstream from station 8 along path P, and for feeding caps 2 to said capping machine in a direction D2 parallel to direction D1.

More specifically, path P extends along a substantially horizontal conveying surface K on which device 5 conveys caps 2 oriented randomly, i.e. with respective axes 3a at any angle with respect to direction D1, and randomly spaced within succession 6, but with respective axes 4a crosswise to surface K, and with respective draw tubes 4 extending upwards.

In the FIG. 1 embodiment, path P comprises two parallel input branches Pa and Pb; succession 6 comprises two streams 6a and 6b of caps 2 fed respectively along branches Pa and Pb; and device 5 comprises two belt conveyors 11a and 11b for feeding caps 2 in respective streams 6a, 6b a long respective branches Pa, Pb to respective engaging stations 8a, 8b extending over a collecting device 12 common to both conveyors 11a and 11b, and which, as described in detail later on, provides for collecting any caps 2 without a draw tube 4.

Orienting device 7 comprises two drums 13 and 14 rotating continuously in opposite directions about respective axes 13a and 14a crosswise to surface K; and an elastic device 15 cooperating with drums 13 and 14 to rotate caps 2 about respective axes 4a.

Figure 3:
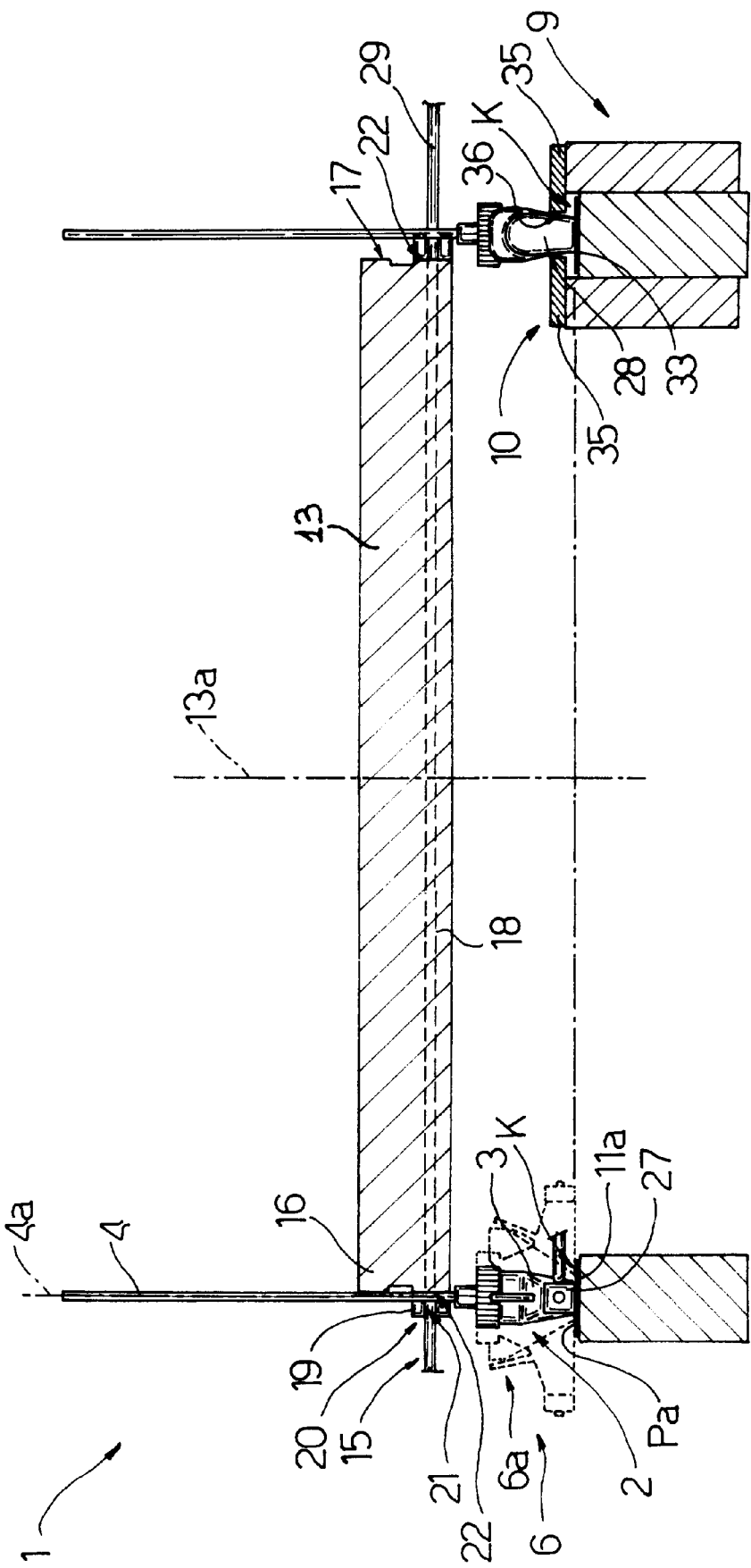
FIG. 3 shows a front view, with parts in section and parts removed for clarity, of a detail in FIG. 1.

Drums 13 and 14 are tangent to each other at unloading station 10, and substantially tangent to respective conveyors 11a and 11b at respective stations 8a and 8b. As shown in FIGS. 1 and 3, each drum 13, 14 comprises a top portion 16 defined radially by a cylindrical peripheral surface 17 coaxial with respective axis 13a, 14a; and a bottom portion 18 in turn comprising a ring 19 extending radially outwards of drum 13, 14 from surface 17. Each ring 19 is defined externally by a respective cylindrical outer surface 20 coaxial with respective axis 13a, 14a and larger in diameter than surface 17, an d comprises a respective annular groove 21 open radially outwards of respective drum 13, 14 and of an inside diameter equal to the diameter of surface 17.

Each drum 13, 14 also comprises engaging means in turn comprising a number of peripheral seats 22 formed through ring 19 of drum 13, 14 and equally spaced about respective axis 13a, 14a with a given spacing Z. Drums 13 and 14 are fitted to respective drive shafts 13b and 14b coaxial with respective axes 13a and 14a, and are so operated that, in use, respective seats 22 are offset with respect to each other as they travel through respective stations 8a and 8b and through station 10.

Figure 2:
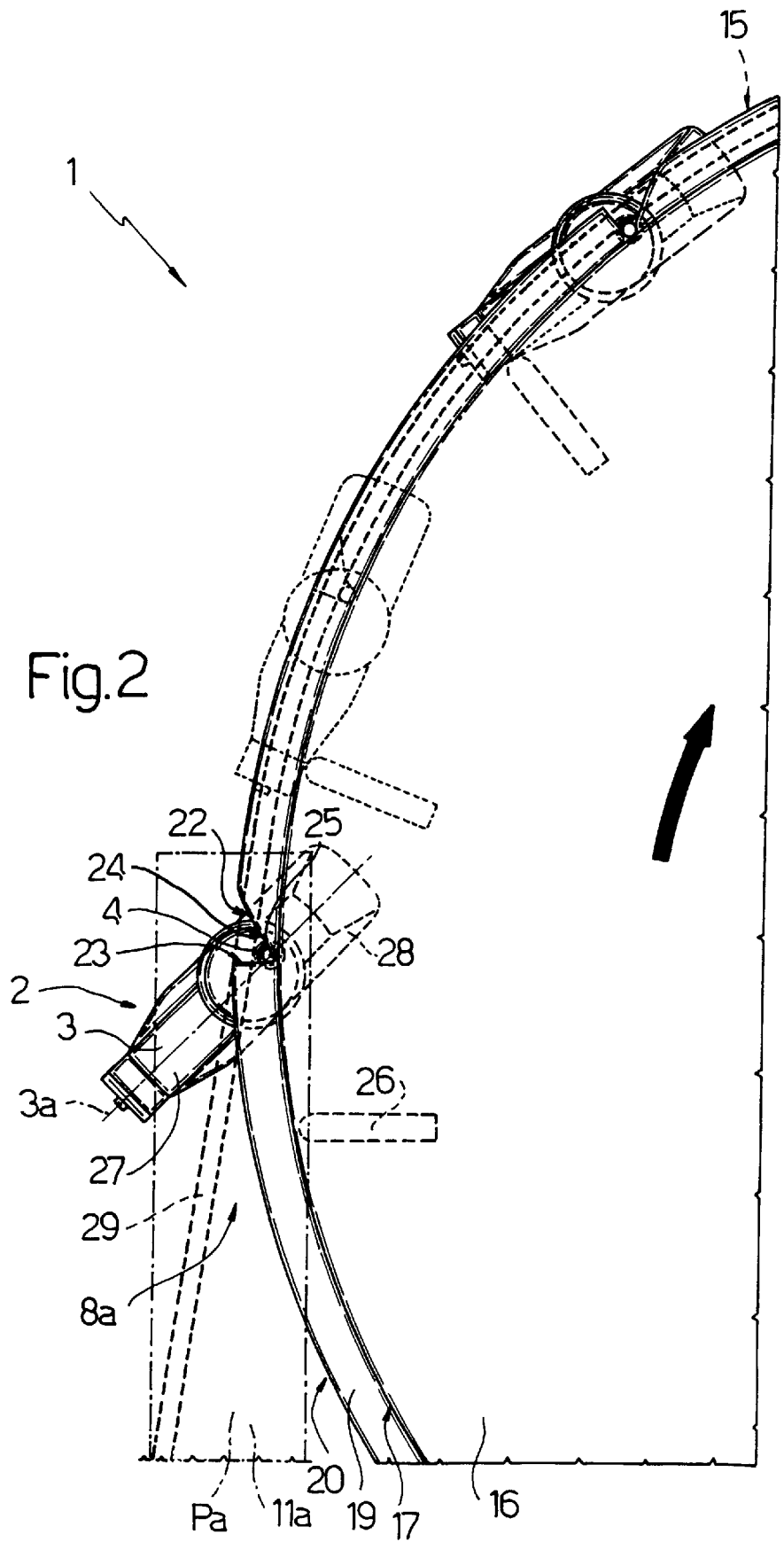
FIG. 2 shows a larger-scale view, with parts removed for clarity, of a detail in FIG. 1.

As shown in FIG. 2, each seat 22 is substantially triangular-shaped in a plane perpendicular to respective axis 13a, 14a, and is defined by a flat surface 23 crosswise to said perpendicular plane and to surface 17, and located radially with respect to axis 13a, 14a. Each seat 22 is also defined by a substantially curved surface 24 crosswise to said perpendicular plane and located to the front of respective surface 23 in the rotation direction of respective drum 13, 14. More specifically, each surface 24 is connected to surface 20 of respective drum 13, 14, and defines, with respective surface 23, a rounded angular cavity 25 for substantially loosely receiving a respective draw tube 4.

Each seat 22 also comprises a fixed stop 26 fitted beneath bottom portion 18 of respective drum 13, 14, and which cooperates with elongated head 3 of a respective cap 2 to arrest rotation of cap 2 about respective axis 4a and set cap 2 to a feed position in which axis 3a of cap 2 is tangent to surface 17. More specifically, each draw tube 4 defines, on respective head 3, two portions 27 and 28 respectively defining a front and rear portion of head 3, and of which portion 27 is of a length L1 greater than the length L2 of portion 28. As each stop 26 is located, along path P, at a distance from respective cavity 25 greater than length L2 of portion 28 and smaller than length L1, each cap 2, with draw tube 4 housed inside cavity 25, is permitted to rotate, in use, about respective axis 4a until portion 27 contacts respective stop 26.

Elastic device 15 comprises elastic means in turn comprising an elastic cord 29, which is secured at opposite ends at stations 8a and 8b, is maintained taut along path P by a tensioning element 30 fitted adjustably to a substantially triangular wall 31 with its apex located between drums 13 and 14 and facing station 10, and engages both grooves 21 of drums 13 and 14 in sliding manner, so as to extend partly about drums 13 and 14 from respective stations 8a, 8b up to two curved lateral edges 32 of wall 31.

Output conveying device 9 comprises a plate 33 (FIG. 3), which extends parallel to direction D2 from station 10, is coplanar with surface K, and provides for receiving caps 2 from drums 13 and 14 at station 10, and for conveying caps 2 in an orderly succession 34, in which caps 2 contact and push against one another, and are positioned with respective axes 3a parallel to direction D2 and with rear portions 28 facing frontwards in the traveling direction of succession 34. Device 9 also comprises two lateral barriers :35, which are located on either side of and substantially over plate 33, are separated by a distance substantially equal to the thickness of heads 3, define a funnel-shaped channel 36 with the wider end facing the apex of wall 31, and cooperate with heads 3 to keep caps 2 in succession 34 in the feed position.

Finally, collecting device 12 comprises two chutes 37 and 38 sloping downwards from respective stations 8a and 8b, and for receiving caps 2 with no draw tubes 4, i.e. the caps 2 that seats 22 and elastic cord 29 have failed to secure inside cavities 25. Chutes 37 and 38 are located directly beneath belt conveyors 11a and 11b, and extend about and beneath the periphery of drums 13 and 14.

In actual use, shafts 13b and 14b rotate respective drums 13 and 14 about respective axes 13a and 14a, so that seats 22 of drums 13 and 14 are fed, offset with respect to each other, through station 10 and through respective stations 8a and 8b. At the same time, belt conveyors 11a and 11b feed respective streams 6a and 6b to respective stations 8a and 8b, where draw tubes 4 of caps 2 collide with elastic cord 29 and begin sliding against respective surfaces 20 of drums 13 and 14.

As a seat 22 traveling through station 8a, 8b passes over surface K and over conveyor 11a, 11b, cord 29 pushes draw tube 4 of cap 2 along curved surface 24 into a respective seat 22; at which point, cap 2 is clamped axially inside seat 22 by the pressure exerted by cord 29 on draw tube 4, and is fed from station 8a, 8b to station 10. In the event draw tube 4 of cap 2 is missing, conveyor 11a, 11b feeds cap 2 beneath cord 29 and on to chute 37, 38, thus acting as a reject device.

Once each cap 2 is housed inside a respective seat 22 with draw tube 4 clamped axially between cord 29 and the inner surfaces of cavity 25, the friction produced by cord 29 on draw tube 4, as cap 2 is fed forward, rotates cap 2 about respective axis 4a; which rotation is only arrested automatically as front portion 27 of head 3 encounters fixed stop 26, i.e. when cap 2 is set to the feed position with axis 3a tangent to surface 17 of drum 13, 14.

At this point, caps 2 are fed towards station 10 and, along the portion of path P at which cord 29 is detached from drums 13 and 14, are supported by a plate 39 coplanar with plate 33 and located beneath triangular wall 31 and rings 19. On reaching station 10, caps 2 are fed on to plate 33, and are pushed one against the other to feed succession 34 in direction D2.

We claim:

1. A method of orienting pump-operated caps; each cap comprising an elongated head and a cylindrical portion extending crosswise from the head; the method comprising the steps of:

feeding a disorderly succession of caps along a path extending along a conveying surface and through an engaging station, and orienting the caps the same way by rotating each cap about a respective axis of rotation crosswise to the conveying surface, the caps being rotated (a) by engaging the cylindrical portion of each cap with an engaging device movable through said engaging station, and (b) by further conveying the caps with the respective cylindrical portions contacting an elastic member extending along said path from at least said engaging station, said engaging device comprising stop means for arresting the rotation of each cap about the respective axis of rotation, and so setting the cap into a given feed position, a number of seats cooperating with said elastic member to receive respective cylindrical Portions of respective said caps at said engaging station; said seats being separated by a given spacing to arrange the caps at a given distance from one another equal to said spacing; and a respective said stop means being associated with each said seat.

2. A method as claimed in claim 1, wherein the caps are positioned along said conveying surface with the respective cylindrical portions extending upwards; wherein each cylindrical portion is defined by a respective draw tube fitted inside the respective head; and wherein said engaging station extends over a collecting means for receiving any caps without a respective draw tube from said engaging device.

3. A method as claimed in claim 1, wherein said path comprises two parallel input branches; wherein said succession of caps comprises a stream of caps for each said input branch; and wherein each stream is fed along the respective input branch to a respective engaging station.

4. A method as claimed in claim 3, wherein said seats are associated with each said input branch of said path; and wherein the seats relative to one of said two input branches are fed through the respective engaging station offset with respect to the seats relative to the other of said two input branches.

5. A method as claimed in claim 4, wherein the caps in each said stream are fed to an unloading station; and wherein the caps in one stream are offset with respect to the caps in the other stream so as to form an orderly succession of caps in which the caps in one of the two streams alternate with the caps in the other stream.

6. A unit for orienting pump-operated caps; each cap comprising an elongated head and a cylindrical portion extending crosswise from the head; the unit comprising:

conveying means for feeding a disorderly succession of caps along a path extending along a conveying surface and through an engaging station, and orienting means for orienting the caps the same way by rotating each cap about a respective axis of rotation crosswise to the conveying surface, said orienting means comprising an engaging means movable through said engaging station to engage the cylindrical portion of each cap, an elastic member located along said path from at least said engaging station and cooperating with said engaging means to rotate each cap about the respective axis of rotation, and a stop means for arresting the rotation of each cap about the respective axis of rotation, and so setting the cap into a given feed position, said engaging means including a number of seats cooperating with said elastic member to receive respective cylindrical portions of respective said caps at said engaging station; said seats being separated by a given spacing to arrange the caps at a given distance from one another equal to said spacing; and a respective said stop means being associated with each said seat.

7. A unit as claimed in claim 6, wherein the cylindrical portions of said caps are each defined by a respective draw tube fitted inside the respective head; and wherein said engaging station extends over a collecting means for receiving from said engaging means any caps without a respective draw tube.

8. A unit as claimed in claim 6, wherein said path comprises two parallel input branches; wherein said succession of caps comprises a stream of caps for each said input branch; and wherein said conveying means comprises, for each said input branch, a conveying device for feeding the respective stream along the respective input branch to a respective engaging station.

9. A unit as claimed in claim 8, wherein said seats are associated with each said input branch of said path; and wherein the seats relative to one of said two input branches are fed through the respective engaging station offset with respect to the seats relative to the other of said two input branches.

10. A unit as claimed in claim 9, wherein said orienting means comprise an unloading station at the end of said input branches; and wherein said seats feed the caps to the unloading station so as to form an orderly succession of caps in which the caps in one of the two streams alternate with the caps in the other stream.

* * * * *